United States Patent
Johnson

(10) Patent No.: US 7,975,643 B1
(45) Date of Patent: Jul. 12, 2011

(54) TELESCOPIC TURNTABLE

(76) Inventor: Johnney C. Johnson, Rio Linda, CA (US)

( * ) Notice: Subject to any disclaimer, the term of this patent is extended or adjusted under 35 U.S.C. 154(b) by 506 days.

(21) Appl. No.: 12/200,723

(22) Filed: Aug. 28, 2008

(51) Int. Cl.
*B05C 13/02* (2006.01)
(52) U.S. Cl. ............ 118/14; 118/13; 118/500; 211/163; 211/129.1; 211/131.1; 211/77; 211/78; 269/54.5; 269/289 R
(58) Field of Classification Search ............... 118/13, 118/14, 500; 220/507, 475; 211/163, 129.1, 211/131.1, 77, 78; 108/94; 294/144, 161; 269/54.5, 289 R, 909; D7/610
See application file for complete search history.

(56) References Cited

U.S. PATENT DOCUMENTS

| 197,931 | A | * | 12/1877 | Haight | 108/94 |
| 2,488,641 | A | * | 11/1949 | Seawright | 108/94 |
| 2,902,174 | A | | 9/1959 | Audsley | |
| 3,690,610 | A | | 9/1972 | Peirce | |
| 3,814,032 | A | | 6/1974 | McMains | |
| 3,912,249 | A | | 10/1975 | Vaca | |
| 3,951,079 | A | * | 4/1976 | Tolleson | 108/94 |
| 4,074,656 | A | | 2/1978 | Haapala | |
| 4,227,484 | A | | 10/1980 | Vaca | |
| D372,400 | S | | 8/1996 | Bearden | |
| 5,617,798 | A | | 4/1997 | Lytell | |
| 5,865,889 | A | | 2/1999 | Birtalan et al. | |

* cited by examiner

*Primary Examiner* — Laura Edwards

(57) ABSTRACT

The present invention features a telescopic turntable to allow a user to decorate a bakery item at various heights comprising a base for supporting a tube in a vertical position, a cake tray at the top of the tube, and a utensil tray at the middle portion of the tube.

1 Claim, 3 Drawing Sheets

TELESCOPIC TURNTABLE

FIELD OF THE INVENTION

The present invention is directed to a cake support. More particularly, the present invention is directed to an adjustable telescopic turntable for allowing a user to decorate a cake and other bakery items at various heights.

BACKGROUND OF THE INVENTION

An object of this invention is to provide a telescopic turntable that allows a user to decorate a cake and other bakery items at various heights. Another object of this invention is to allow a person to easily decorate a cake or other bakery items without having to bend over.

The present invention features a telescopic turntable to allow a user to decorate a cake and other bakery items at various heights. The telescopic turntable comprises a tube, a base for supporting the tube in an upright vertical position, a cake tray for holding a bakery item disposed at the top of the tube, and a utensil tray for holding utensils disposed at the middle portion of the tube. A base extension collar is disposed top of the base, a top extension collar is disposed on the bottom of the cake tray, and a first middle extension collar and a second middle extension collar is disposed on the top of the utensil tray and the bottom of the utensil tray, respectively. The first middle extension collar and the second middle extension collar allow two tubes to be used with the present invention such that the height of the utensil tray and/or the cake tray may be adjusted.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
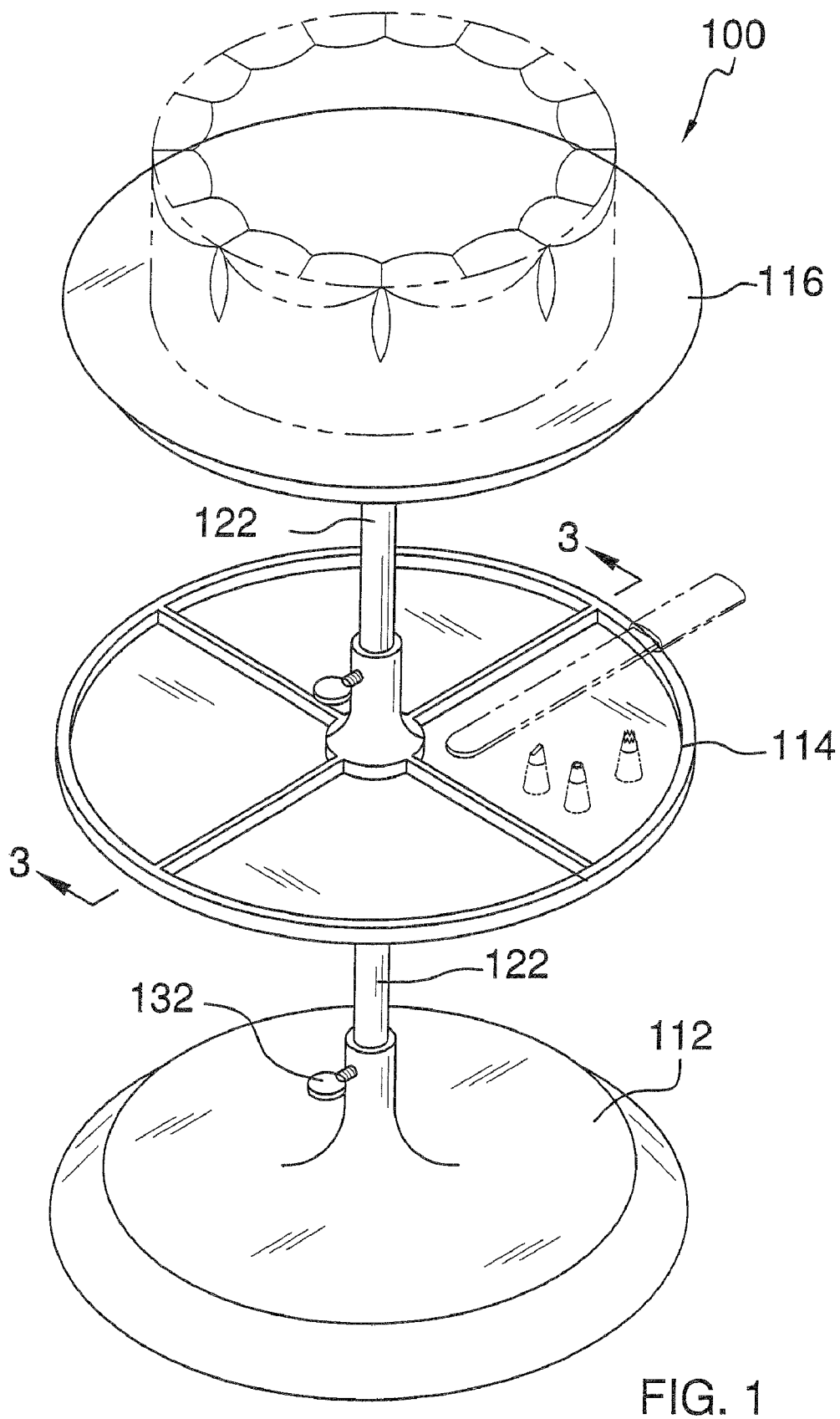
FIG. 1 is a perspective view of the telescopic turntable of the present invention.
Figure 2:
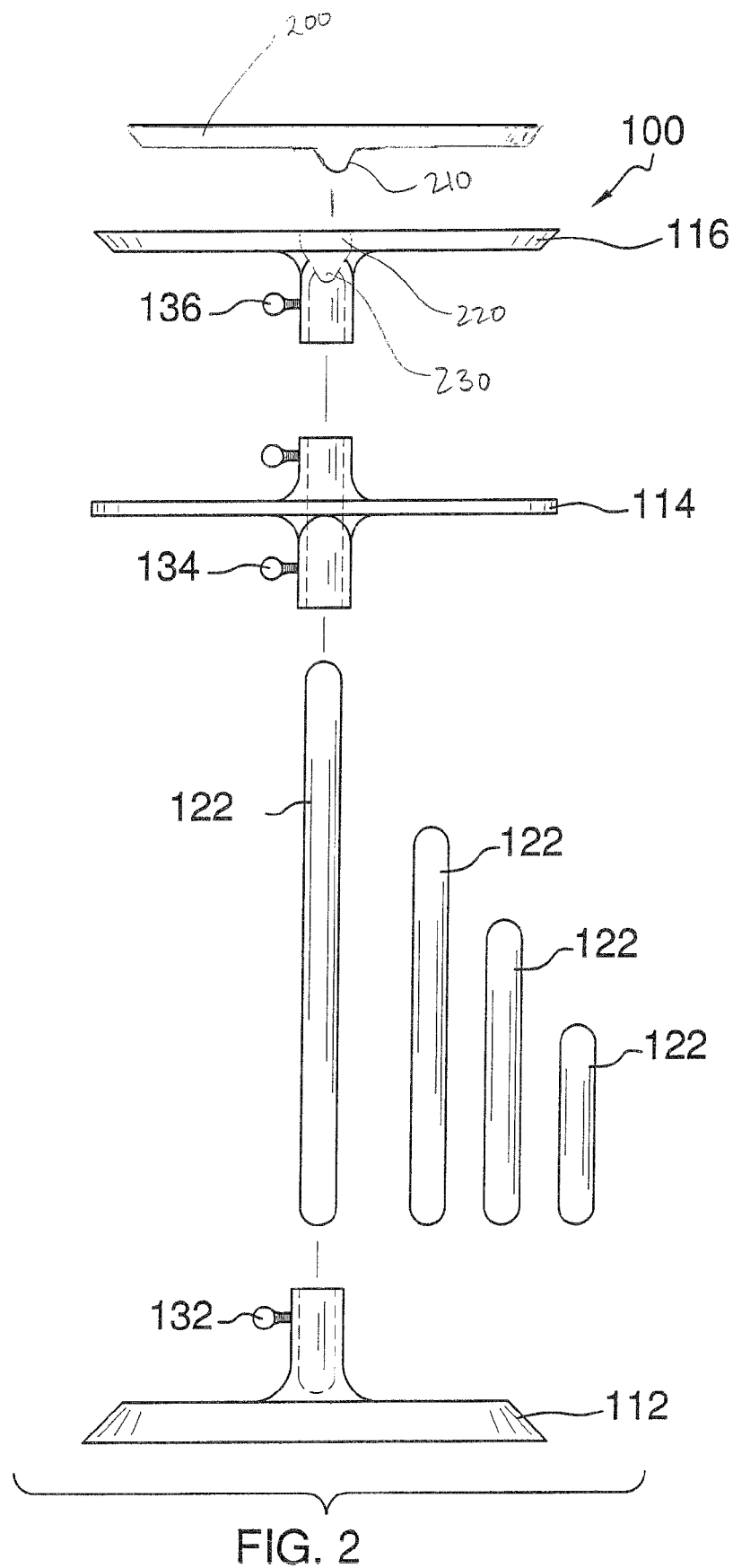
FIG. 2 is an exploded front view of the telescopic turntable of FIG. 1.
Figure 3:
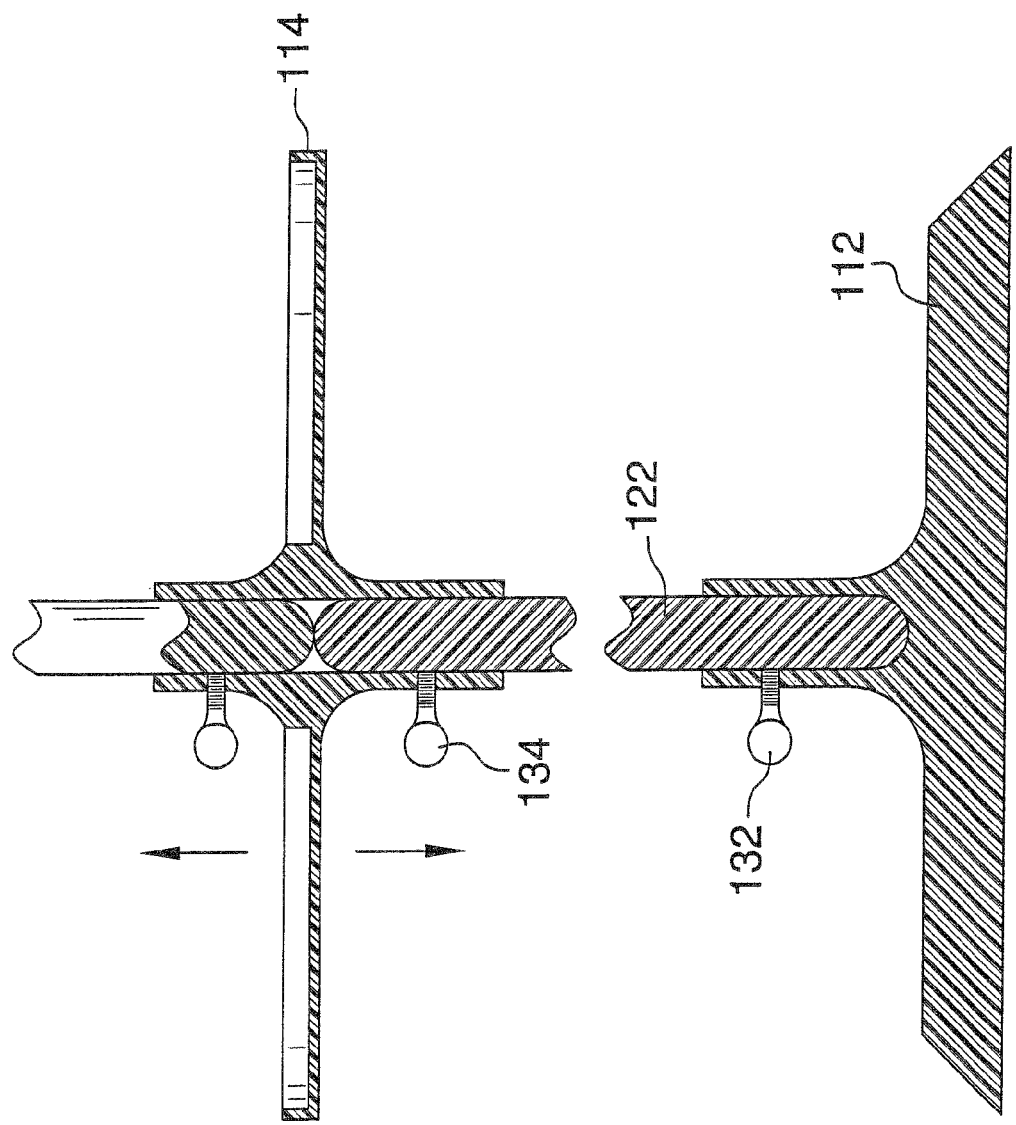
FIG. 3 is a front cross-sectional view of the bottom portion of the telescopic turntable of FIG. 1.

The following is a listing of numbers corresponding to a particular element refer to herein:
100 telescopic turntable
112 base
114 utensil tray
116 cake tray
122 tube
132 tightening screw
134 tightening screw
136 tightening screw
200 turning plate
210 turning knob
220 hole in cake tray
230 turning knob compartment Referring now to FIGS. 1-3, the present invention features a telescopic turntable to allow a user to decorate a cake and other bakery items at various heights. The telescopic turntable comprises a tube having a first end, a second end, and a middle portion. A base having a top surface and a bottom surface is disposed at the first end of the tube, wherein the base member is for supporting the tube in an upright vertical position. The first end of the tube is removably attached to the base via a base extension collar disposed on the top surface of the base.

A cake tray having a top surface, a bottom surface, and a center is disposed at the second end of the tube, wherein the cake tray is for holding a bakery item (e.g., a cake). In some embodiments, the cake tray is for holding a bakery item such that a user may decorate the bakery item. The cake tray is removably attached to the second end of the tube via a top extension collar disposed on the bottom surface of the cake tray. In some embodiments, a hole is disposed in the center of the cake tray connecting to a hollow turning knob compartment disposed at the top of the top extension collar, wherein the hole and the turning knob compartment are for receiving a turning knob disposed on the bottom of a turning plate. In some embodiments, the turning knob fits into the hole and the turning knob compartment to allow the turning plate to spin freely about the axis of the tube.

A utensil tray is disposed at the middle portion of the tube, wherein the utensil tray is for holding one or more tools (e.g., a knife, a cake decorating utensil). The utensil tray has a top surface, a bottom surface, and a center hole, wherein the center hole is for receiving the tube. The utensil tray is removably attached to the middle portion of the tube via a first middle extension collar disposed on the bottom of the utensil tray and an second middle extension collar disposed on the top of the utensil tray.

The base extension collar has a top edge, a bottom edge, a side, and an internal compartment for receiving the first end of the tube. The bottom edge of the base extension collar is attached to the top surface of the base, and the top edge of the base extension collar is open such that the first end of the tube may be inserted into the internal compartment of the base extension collar.

The top extension collar has a top edge, a bottom edge, a side, and an internal compartment for receiving the second end of the tube. The bottom edge of the top extension collar is attached to the bottom surface of the cake tray, and the bottom edge of the top extension collar receives the turning piece disposed on the bottom surface of the cake tray. The top edge of the top extension collar is open such that the second end of the tube may be inserted into the internal compartment of the top extension collar.

The first middle extension collar has a top edge, a bottom edge, a side, and an internal compartment for receiving the tube. The bottom edge of the first middle extension collar is attached to the top surface of the utensil tray. The bottom edge and the top edge are open such that the tube may be inserted into the internal compartment of the first middle extension collar. The internal compartment is aligned with the center hole in the utensil tray such that the tube slides into the first middle extension collar and through the center hole in the utensil tray simultaneously.

The second middle extension collar has a top edge, a bottom edge, a side, and an internal compartment for receiving the tube. The bottom edge of the second middle extension collar is attached to the bottom surface of the utensil tray. The bottom edge and the top edge are open such that the tube may be inserted into the internal compartment of the second middle extension collar. The internal compartment is aligned with the center hole in the utensil tray and the internal compartment of the first middle extension collar such that the tube slides into the first middle extension collar, through the center hole in the utensil tray, and the second middle extension collar simultaneously.

Disposed on the side of each of the base extension collar, the top extension collar, the first middle extension collar, and the second middle extension collar is a tightening screw for securing the tube in the extension collar. When the tightening screw is tightened, the screw moves toward the tube and presses up against the tube such that the tube is immobile and is prevented from being removed from the extension collar. When the tightening screw is loosened, the screw is moved away from the tube and does not press up against the tube. The tube is then not immobilized and can be removed from the extension collar.

The first middle extension collar and the second middle extension collar allow the height of the utensil tray to be adjusted. For example, when the tightening screws of the first middle extension collar and the second middle extension collar are loosened, the utensil tray may be slid up and down the tube. When a user chooses a position for the utensil tray, he/she may then tighten the tightening screws such that the utensil tray does not move.

The first middle extension collar and the second middle extension collar allow two tubes to be used with the present invention. For example, in some embodiments, a first tube is inserted into the base extension collar and the second middle extension collar, and a second tube is inserted into the top extension collar and the first middle extension collar. This allows the height of the utensil tray and/or the cake tray to be adjusted.

In some embodiments, the base extension collar and/or the top extension collar and/or the first middle extension collar and/or the second middle extension collar helps to prevent the tube from leaning when it is in an upright vertical position.

The tube (e.g., first tube, second tube) may be of various heights (see FIG. 2). For example, in some embodiments, the tube is between about 2 to 3 inches in height as measured from the first end to the second end. In some embodiments, the tube is between about 3 to 6 inches in height as measured from the first end to the second end. In some embodiments, the tube is between about 6 to 9 inches in height as measured from the first end to the second end. In some embodiments, the tube is between about 9 to 12 inches in height as measured from the first end to the second end.

In some embodiments, the cake tray and/or the utensil tray is circular and is between about 6 to 9 inches in diameter. In some embodiments, the cake tray and/or the utensil tray is circular and is between about 9 to 12 inches in diameter. In some embodiments, the cake tray and/or the utensil tray is circular and is between about 12 to 15 inches in diameter. In some embodiments, the cake tray and/or the utensil tray is circular and is between about 15 to 18 inches in diameter. In some embodiments, the cake tray and/or the utensil tray is circular and is between about 18 to 21 inches in diameter. In some embodiments, the cake tray and/or the utensil tray is circular and is between about 21 to 24 inches in diameter.

As used herein, the term "about" refers to plus or minus 10% of the referenced number. For example, an embodiment wherein the cake tray is about 10 inches in diameter includes a cake tray that is between 9 and 11 inches in diameter.

In some embodiments, the utensil tray is a standard bakery turntable known to one or ordinary skill in the art. In some embodiments, the cake tray is a standard bakery platter known to one of ordinary skill in the art. In some embodiments, the extension collars are similar to a standard screw tightening device known to one of ordinary skill in the art.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A telescopic turntable for allowing a user to decorate a cake or other bakery items at various heights, said turntable comprising:
    (a) a tube having a first end, a second end, and a middle portion;
    (b) a base for supporting the tube in an upright vertical position, wherein the base has a top surface and a bottom surface, wherein the base is removably attached to the first end of the tube via a base extension collar disposed on the top surface of the base; said base extension collar having a top edge, a bottom edge, a side, and an internal compartment for receiving the first end of the tube; wherein the bottom edge of the base extension collar is attached to the top surface of the base, and the top edge of the base extension collar is open such that the first end of the tube may be inserted into the internal compartment of the base extension collar;
    (c) a cake tray for holding a bakery item, wherein the cake tray has a top surface, a bottom surface, and a center; wherein the cake tray is removably attached to the second end of the tube via a top extension collar disposed on the bottom surface of the cake tray; said top extension collar having a top edge, a bottom edge, a side, and an internal compartment for receiving the second end of the tube; wherein the bottom edge of the top extension collar is attached to the bottom surface of the cake tray; wherein the top edge of the top extension collar is open such that the second end of the tube may be inserted into the internal compartment of the top extension collar;
    (d) a hole disposed in the center of the cake tray, said hole connected to a hollow turning knob compartment disposed at the bottom edge of the top extension collar; wherein the hole and the turning knob compartment are for receiving a turning knob disposed on a turning plate; wherein the turning knob fits into the hole and the turning knob compartment to allow the turning plate to spin freely about the axis of the tube;
    (e) a utensil tray for holding a tool, wherein the utensil tray has a top surface, a bottom surface, and a center hole, wherein the center hole is for receiving the tube; wherein the utensil tray is removably attached to the middle portion of the tube via a first middle extension collar disposed on the bottom of the utensil tray and a second middle extension collar disposed on the top of the utensil tray; said first middle extension collar having a top edge, a bottom edge, a side, and an internal compartment for receiving the tube; wherein the bottom edge of the first middle extension collar is attached to the top surface of the utensil tray; wherein the bottom edge and the top edge are open such that the tube may be inserted into the internal compartment of the first middle extension collar; wherein the internal compartment is aligned with the center hole in the utensil tray such that the tube slides into the first middle extension collar and through the center hole in the utensil tray simultaneously; said second middle extension collar having a top edge, a bottom edge, a side, and an internal compartment for receiving the tube; wherein the bottom edge of the second middle extension collar is attached to the bottom surface of the utensil tray; wherein the bottom edge and the top edge are open such that the tube may be inserted into the internal compartment of the second middle extension collar; wherein the internal compartment is aligned with the center hole in the utensil tray and the internal compartment of the first middle extension collar such that the tube slides into the first middle extension collar, through the center hole in the utensil tray, and the second middle extension collar simultaneously; and (f) a tightening screw disposed on the side of each of the base extension collar, the top extension collar, the first middle extension collar, and the second middle extension collar; wherein the tightening screw is for securing the tube in the respective extension collars;

wherein the first middle extension collar and the second middle extension collar allow the height of the utensil tray to be adjusted; wherein the first middle extension collar and the second middle extension collar allow two tubes to be used.

* * * * *